Patented Nov. 16, 1937

2,099,367

UNITED STATES PATENT OFFICE 2,099,367

METHOD OF COMPOUNDING CERAMIC PRODUCTS

Jacques Gustave Adolphe Lefranc, Paris, France

No Drawing. Application February 4, 1935, Serial No. 4,992. In France February 6, 1934

6 Claims. (Cl. 106—9)

This invention relates to the production of ceramic products such as bricks or blocks for building or fireproof constructions, for mortars, and the like.

It is a known fact that the manufacture of such products from nonplastic substances such as silica in its most widely varying forms, its silico-aluminous derivatives whether natural or artificial, alumina (bauxite, corundum, etc.), magnesia, and other nonplastic substances, offers real difficulties, and requires the additional use of other substances of an agglomerating or a binding nature.

Amongst other binders for the nonplastic material, use has already been made of soluble phosphate salts which are introduced into the nonplastic mass, either directly or employed as a solution in phosphoric acid.

In contradistinction thereto, the present invention relates to a process for the manufacture of ceramic articles from nonbinding materials comprising an earth or alkaline earth phosphate binder and is characterized by the employment of a mono- or bi-phosphate which is obtained by the reduction of a tri-phosphate by treatment with a monobasic or bibasic acid other than phosphoric acid, the quantity of acid being such that there will be no excess of free acid.

The various phosphates, and chiefly the monocalcic or the bicalcic phosphates, are expensive and the tricalcic phosphate, for instance a natural phosphate, which is brought back to the state of monocalcic or bicalcic phosphate by treatment with the corresponding quantity of a monobasic or a bibasic acid is economic. It is possible, for instance, to treat a molecule of tricalcic phosphate with one or two molecules of a bibasic acid such as sulphuric acid or two or four molecules of a monobasic acid such as hydrochloric acid, in such way that in the limiting case of the retrogradation of the tricalcic phosphate to the state of monocalcic phosphate, there will be no free acidity of a phosphoric, hydrochloric or sulphuric nature, which might in practice, cause a wear of the moulding material, due to a chemical attack.

In the case of hydrochloric acid, the retrograde reaction is as the following:

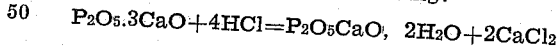

During the ceramic baking process, under the action of the heat, the phosphate of calcium (or its derived products and compounds) causes the solidification of the mass, either by a surface fusibility or by a reaction or a combination with the nonplastic material.

The mono- or bi-phosphates, as well as their pyrogenous derivatives such as the mono- or bi-pyrophosphates or the metaphosphates, or the mixtures of the same, will further produce, by the effect of heat, different effects of a physical and a chemical nature, and will act, for example, as a mineralizer (they transform an amorphous substance, or a mixture of amorphous or other substances, into a crystal or crystals of a definite nature), or as an agent of crystal transformation (a crystal being transformed into another crystal, for instance, quartz into tridymite).

It is obvious that the general composition of the binding substances, as will be indicated below, may include any suitable additions which are adapted to improve, complete or activate their mineralizing properties, to exercise a physical or chemical action, or to produce a ceramic effect. Thus it may be advantageous to employ, as an addition to the binding substance, a proportion, even though small, of certain fluorides known per se, such as the fluoride of calcium, cryolite, the fluoride or fluoro-silicate of sodium or potassium, the fluoride of aluminium, the different fluorine salts, such as the fluoro-borates, fluorophosphates, etc., which are dissolved, if need be, in the presence of boric acid or its combinations. In like manner, according to the nature or the use of the product and in order to modify the texture and to improve the qualities, one may regulate the temperature of the baking, or introduce into the composition various additions, in suitable proportions, for instance the silicates of aluminium (clays or kaolin, baked or not); fluxes such as certain alkaline earth carbonates, or earthy carbonates, their bases, or any other oxides such for instance as ferrous oxide, feldspar, slag, or glass powder.

An example of carrying out the invention will now be described.

In order to prepare a suitable reagent, tricalcic phosphate, for instance a natural phosphate rich in tricalcic phosphate is treated by the appropriate volume of commercial hydrochloric acid, or the corresponding quantity of sulphuric acid, required for its transformation into monocalcic or bicalcic phosphate according to the case, in conformity with the general equation above indicated.

The thick semi-liquid substance obtained after the reaction is diluted by the quantity of water required for the proper impregnation of the material, or as a rule, 5 to 10 litres per 100 kg.

The nonplastic material is impregnated and moistened with the preparation, previously adding to it and mixing with it a small quantity of either an alkaline earth base or earthy base (lime, magnesia, or even oxide of zinc), or a carbonate, or a basic compound such as dolomite, the slag of blast furnaces, or a chloride of calcium, magnesium or aluminium, or a base together with its carbonate and with a chloride.

In case a chloride should be used, its introduction into the composition will be suitably effected by adding it to the phosphate to be subjected to retrogradation.

For 100 kg. of the nonplastic material or mixture to be treated, there will be used, for example:

| | | |
|---|---|---|
| Tricalcic phosphate | kg | 0.5 to 1.2 |
| Hydrochloric acid, at 20° Bé | lit | 0.31 to 1.51 |
| Water (according to the needs of the treatment) | do | 5 to 10 |

It is obviously possible to employ a greater proportion of binder, though this is not necessary.

By means of this preparation, one will wet and impregnate the nonplastic material, having first intimately mixed it with 1 to 10 kg. of an alkaline earth base, or an earthy base or the like, as above indicated.

It should be noted that in the presence of a sufficient quantity of chloride, for instance in the relation of $P_2O_5CaO, 2H_2O$ to $2MCl_2$, the addition of a base is not essential in order to constitute the binding substance and to obtain the hardening of the material.

After the addition of either of the binding substances which are suitably selected and proportioned in order not to effect or modify, for instance, the properties of the refractory material, the mass, which has been carefully made homogeneous, is given the proper shape by any suitable means, such as ramming, pounding or pressure. Finally, after drying, the moulded pieces, which are temporarily hardened, are baked by the ceramic process. It should be mentioned in this connection that the continuous furnace affords a systematic drying and baking, without any handling.

As a further example, in the case of sand, one adds to the sand and mixes therewith a suitable quantity of an earthy base or an alkaline earth base, such as lime or magnesia, using for instance the following proportions:

| | Kilograms |
|---|---|
| Sand | 100 |
| Carbonate of lime, magnesia or dolomite | 0 to 20 |
| Oxide: lime or magnesia | 0 to 10 |

This composition is moistened and bound with a binder composed as above indicated.

The binder thus composed will, if required, be diluted in order to make up the volume necessary to impregnate the nonplastic mixture 5 to 10 litres of binder being used as a rule per 100 kg. of nonplastic composition.

The ceramic composition is then shaped by any suitable means, for instance by ramming or moulding.

After drying, during which the products shaped as above mentioned will acquire their temporary hardness and consistency, the ceramic baking takes place at a temperature which is gradually reached, and varies with the ceramic composition, the nature and the proportion of the additions. This temperature is comprised between 1100° and 1500° C., and usually between 1200° and 1300°. This ceramic baking will suitably take place in a continuous furnace, which systematically effects the drying and the consecutive rise of temperature, without any intermediate handling.

The baking gives rise to effects and actions of the usual ceramic nature. The iron already present in the material in the state of oxide or derived combination, is eliminated, wholly or partially, in the state of volatile chloride.

Obviously, the aforesaid mixtures may be completed, as above set forth in a general manner, by any known suitable additions which can improve, complete or activate the mineralizing properties of the said mixtures, or can exercise a physical or chemical action.

It is evident that the invention has further for its object the ceramic products obtained by the said process. Such products may have the appearance of bodies having definite shapes (bricks, blocks or like elements of construction) whether solid or hollow.

It is also feasible, by the above process, to prepare mortars adapted to bind and connect the element of refractory brickwork, thus making such parts homogeneous. For this purpose, the nonplastic material, properly pulverized and suitably composed as above stated, is treated by the ably reagent, in the corresponding quantity, diluted with the amount of water necessary to obtain a mortar which is easy to handle and to apply for instance by the trowel, if need be, after having moistened the surfaces of the ceramic pieces with the reagent. Subsequently, the action of the temperature will solidify the assemblage.

The ceramic product can also be used for the preparation of facings, coatings, flooring, and filling for furnaces.

Having now particularly described and ascertained the nature of my said invention and in what manner the same is to be performed, I declare that what I claim is:

1. A method for the manufacture of ceramic materials which consists in preparing a binder by treating a calcic phosphate containing several calcic molecules by an acid, so as to bring back said phosphate to the state of an inferior calcic phosphate, the quantity of acid being such that there will be no excess of free acid and mixing said binder with a nonplastic material.

2. A method according to claim 1 in which a chloride is added to the mixture.

3. A method according to claim 1 in which tricalcic phosphate is brought back to the state of bicalcic phosphate.

4. A method according to claim 1 in which tricalcic phosphate is brought back to the state of monocalcic phosphate.

5. A ceramic material obtained by the method according to claim 1.

6. A method according to claim 1, in which the following proportions are used:

| | | |
|---|---|---|
| Tricalcic phosphate | kg | 0.5 to 1.2 |
| Hydrochloric acid at 20° Bé | lit | 0.31 to 1.51 |
| Water | do | 5 to 10 |
| Nonplastic material, about | kg | 100 |

JACQUES GUSTAVE ADOLPHE LEFRANC.